April 11, 1944.     R. W. JONES     2,346,168
HORSEPOWER INDICATOR
Filed April 1, 1941
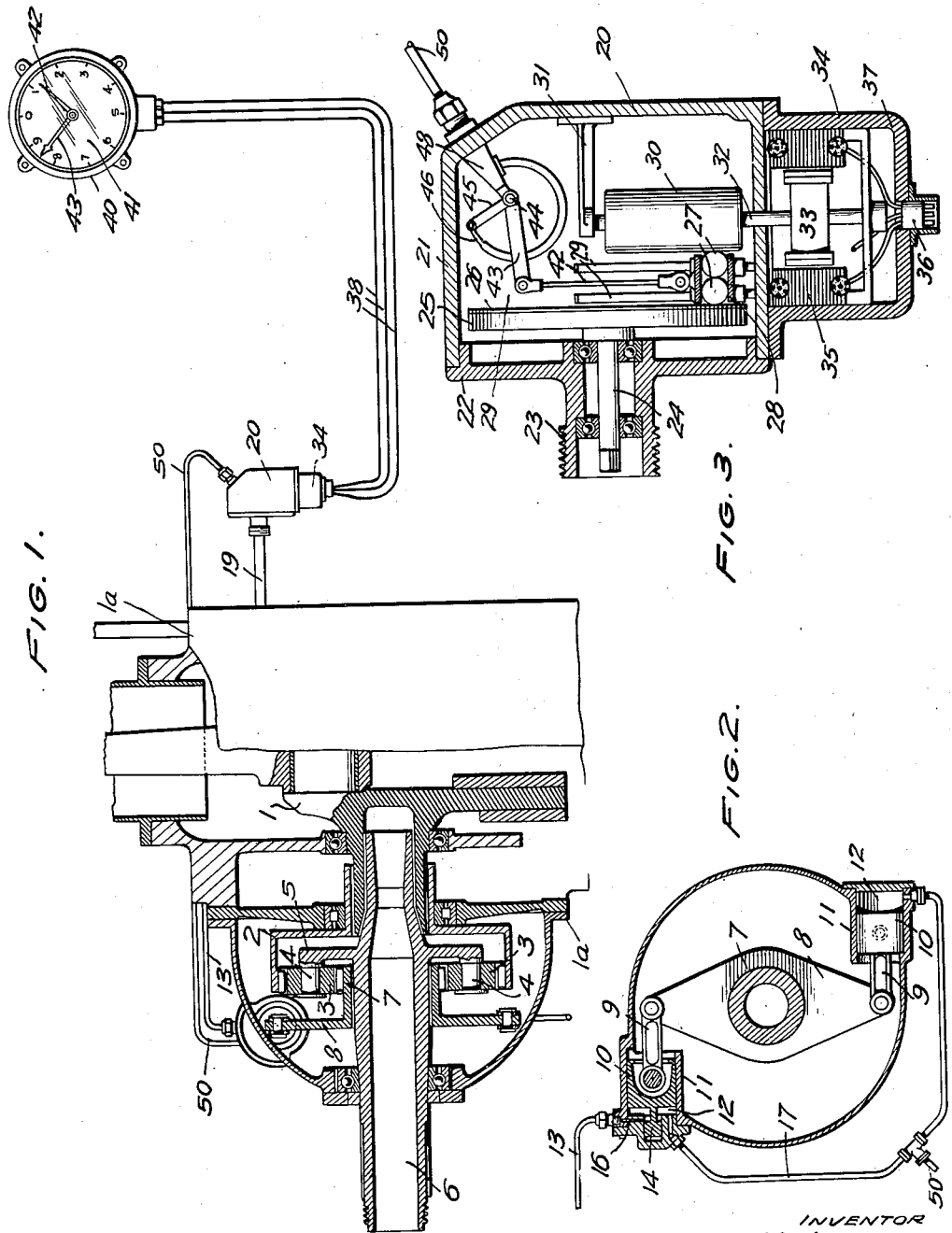

Patented Apr. 11, 1944

2,346,168

UNITED STATES PATENT OFFICE 2,346,168

HORSEPOWER INDICATOR

Raymond W. Jones, Bethesda, Md.

Application April 1, 1941, Serial No. 386,313

2 Claims. (Cl. 265—25)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for directly indicating the horsepower output of internal combustion engines under operating conditions such as when employed for the propulsion of aircraft.

It has heretofore been customary to determine the horsepower output of aircraft engines solely by the factors of engine intake manifold pressure and engine speed and since the manifold pressure does not vary as a linear function of horsepower output the resulting horsepower indications derived therefrom are subject to considerable errors. There have been developed in recent years however several types of fluid pressure dynamometers for use in conjunction with geared engines in which the engine torque is very accurately measured and indicated by measuring the reaction torque exerted on the normally stationary element of a planetary reduction gear train. By multiplying the indicated value of engine torque by the instant value of engine speed, the instant value of horsepower is obtained. The above procedure requires a calculation on the part of the pilot and if a simple indicator were provided to perform this function and directly indicate the engine horsepower on a single dial the torque indicator could be incorporated in engines as manufactured and the single horsepower indicator employed to replace the numerous instruments now employed to indicate the various engine factors related thereto. The present invention provides a very simple device for accomplishing this result, the theory of operation of which will now be explained:

An engine torque indicator of the type above noted is described in detail in the Society of Automotive Engineers Journal, vol. 42, No. 2, February 1938, and vol. 44, No. 6, June 1939. One indicator preferred for use as a part of the structure of the present invention provides a rotatable mounting for the normally stationary sun gear of a planetary reduction gear train, the reaction torque exerted on the gear being opposed by a torque arm connected to the sun gear and in turn connected to oppositely acting pistons in a pair of hydraulic cylinders. Oil under pressure is admitted to the cylinders through an automatically controlled valve so that the oil pressure exerted on the pistons is just sufficient to counteract the torque exerted on the torque arm and the value of this pressure $P_q$ is a direct measure of the engine torque when multiplied by a constant $K_1$ depending on the particular engine gear reduction, the length of the torque arm and the area of the pistons in the hydraulic cylinders.

We may express the horsepower output of any engine by the well-known formula (1) $$H. P. = \frac{2\pi \times T \times R. P. M.}{33,000}$$

Where $T$=engine torque in foot pounds.

As noted above the engine torque indicated by the torque indicator may be expressed by the formula.

(2) $$T = K_1 \times P_q$$

where $K_1$ is the design constant and $P_q$ is the fluid pressure in the torque indicator cylinders as above noted.

Substituting the value of T from Equation 2 into Equation 1 and combining all constants into a single constant K we obtain:

(3) $$H. P. = K \times P_q \times R. P. M.$$

Since the product of $K \times P_q$ will be a fraction less than unity, the multiplication of this fraction and the instant value of engine speed may be affected in a very simple manner by means of a variable speed transmission inserted in the drive of an engine driven tachometer, so that the change in the driving ratio of the tachometer and hence the driving speed thereof will be equal or directly proportional to the product of the factors K and $P_q$. The speed then indicated by the pointer of the speed measuring means will then directly indicate the value of engine horsepower output and the tachometer dial may be graduated in terms of engine horsepower instead of engine revolutions per minute.

The principal object of the present invention is the provision of an indicator operative to indicate on a single dial the horsepower output of an associated prime mover.

A further object of the invention is the provision of an instrument for directly indicating the horsepower output of an associated engine, comprising a tachometer, a driving means for said tachometer including a variable speed transmission and drivingly connected to the associated prime mover, and means responsive to the variation in prime mover torque for adjusting the variable speed transmission to cause the tachometer indication to indicate the prime mover power output in terms of horsepower.

Another object of the invention is the provision in combination with an engine torque measuring means, of a tachometer driven by and normally indicating the engine speed and means actuated by said torque indicating means for varying the indication of said tachometer to indicate the instant value of engine horsepower output.

Other objects of the invention not specifically enumerated above will appear by reference to the detailed description in the specification and to the appended drawing in which:

Fig. 1 is a diagrammatic illustration of the components of a horsepower indicator in accordance with the invention, some parts being shown in section.

Fig. 2 is a front elevation sectional view of the structure of a known type of engine torque measuring device illustrated in Fig. 1, and Fig. 3 is a view partly in section illustrating the novel variable speed drive and control therefor employed in the indicator of Fig. 1.

Referring now to Figure 1, the reference numeral 1a generally indicates an aircraft engine of conventional character having a crank shaft 1 drivingly connected to the orbit gear 2 of a planetary type reduction gear. The orbit gear has meshing therewith a plurality of planet pinions 3, each rotatable on journal pins 4, mounted on the rotatable carrier 5, which is secured to and formed integral with the propeller shaft 6, the latter being suitably journalled at its inner end in a bearing formed in the hollow central portion of the crank shaft and journalled at its outer end in a bearing carried by the gear housing. The planet gears 3 are adapted to mesh with the teeth of a sun gear 7 rotatably journalled on the propeller shaft 6, the sleeve portion of the sun gear having a torque arm 8 secured to the outer end thereof, and the torque arm extending radially on either side of the propeller shaft 6. As seen in Fig. 2 the torque arm 8 is pivotally connected by means of connecting rods 9 to pistons 10 respectively reciprocably mounted in fluid pressure cylinders 11 formed as integral parts of the reduction gear housing. The pistons 10 are located at equal radial distances on opposite sides of the axis of the propeller shaft and, by means of fluid pressure admitted to the respective chambers 12 of the cylinders 11, counteract and resist rotation of the torque arm and sun gear. Fluid pressure generated by an engine driven oil pump (not shown) is admitted by means of a conduit 13 to a passage 16 formed in the head of the upper cylinder 11, and the flow of high pressure oil from the passage 16 to the chamber 12 of the upper cylinder is controlled by means of a valve 14, housed within an extension of the head of the upper cylinder 11, and directly connected to the associated piston 10 therein. Each of the chambers 12 are inter-connected by means of a conduit 17 which communicates with a conduit 50 adapted to be connected to a pressure indicating or responsive means to indicate or measure the engine torque. Bleed ports (not shown) are associated with each of the chambers 12 to allow a continuous small discharge of oil therefrom, which oil is returned to the engine oiling system through the reduction gear housing. If the engine torque should change, for example, to increase, the valve 14 will open the passage 16 to allow a greater flow of oil to the chamber 12, building up the pressure therein, which pressure is communicated to the chamber 12 of the lower cylinder 11 by means of the conduit 17, and the increase of pressure in the cylinders 11 acting on the respective pistons 10, counteracts the increase of torque exerted on the torque arm 8 from the sun gear 7 of Fig. 1. If the engine torque should decrease, the valve 14 will move axially toward the right to restrict the flow of oil from the passage 16 to the chamber 12 of the upper cylinder 11 and because of the continuous drain therefrom, will reduce the pressure in the cylinder chambers 12 until a new equilibrium pressure is attained just balancing the existing reaction torque exerted by the reduction gear on the torque arm 8. For every value of engine torque there will exist a corresponding pressure in the chambers 12 of the respective cylinders 11 of an amount just necessary to balance the torque exerted on the torque arm 8, and hence the pressure existing within the connecting conduit 17 is a definite measure of the torque developed by the engine at any time, and the engine torque in foot-pounds may be readily determined by multiplying the pressure within the conduit 17 by a constant which depends, of course, on the area of one of the pistons 10, the length of the torque arm 8 between the pivotable points of pivotal connection to the connecting rods 9, and the reduction gear ratio of the planetary gear Fig. 1. Thus a pressure responsive element or gauge connected to the conduit 17 may be so designed and constructed that it will directly indicate the engine torque in foot-pounds. The structure so far described forms a well-known torque indicator such as illustrated and described in the previously-mentioned publication and the specific construction of which forms no part of the present invention.

Referring again to Fig. 1, the reference numeral 20 generally indicates a variable speed transmission inserted between a tachometer driving shaft 19 associated with the engine 1a and the tachometer generator of an electric impulse transmitter unit generally indicated by the reference numeral 34. The tachometer generator of the transmitter 34 is connected by means of conductor 38 to an electrical indicator unit 40 mounted in the engine cockpit and having a calibrated dial 41 cooperating with pointers 42 and 43 to indicate engine horsepower in units of hundreds and thousands. Speed setting of the variable speed transmission 20 is adapted to be controlled in accordance with the existing pressure in the conduit 50 connected to the torque measuring means, previously described, so that the speed of the tachometer generator is so modified that the tachometer indicating pointers 42 and 43 directly indicate the value of engine horsepower with relation to the scale 41 instead of indicating the value of engine revolutions as in normal tachometers. The electric impulse transmitter 34 and indicator unit 40 together form a well-known electric tachometer or speed measuring means. The novel means for varying the speed setting of the variable speed transmission 20 in accordance with the measured value of engine torque will now be described.

Referring now to Fig. 3, the variable speed change mechanism generally indicated by the reference numeral 20 is seen to comprise a metal housing 21 open at one end thereof and adapted to be closed by means of a cover plate 22 secured to the housing by screws or other fastening means (not shown). The cover plate 22 is provided with an enlarged centrally disposed annular boss 23 which serves to journal a power-receiving member such as a driving shaft 24 by means of suitable ball bearings mounted therein. The driving shaft 24 is adapted to be connected at its outer end to the engine driven tachometer driving shaft 19 of Fig. 1 and at its inner end carries a disc 25 located within the housing 21 and the disc being provided with a facing 26 made of a material having a high coefficient of friction. Rotation of the disc 25 is frictionally transmitted to the idler rollers 27 which are formed as ball bearings in loaded contact with each other and supported within a shiftable carrier 28, the carrier being slidable on guides 29 to move parallel to the plane of the disc 25. One of the idling rollers 27 is in frictional contact with the periphery of a cylindrical roller 30 and frictionally transmits rotation thereto from the disc 25. The roller 30 is concentrically mounted on a power take-off shaft 32 which is journalled by a supporting bracket 31 and has its lower end projecting through the lower wall of the housing 21. The shaft 32 is adapted to drive the permanent magnet rotor 33 of the tachometer generator, the generator being provided with two-phase or three-phase windings mounted on the laminated stator 35, the windings being electrically connected to a plug 36 which serves as a connector for the electrical conductors 38 of Fig. 1. The generator is of a well-known type generally employed when driven by an engine to generate currents having a frequency directly proportional to the rotational velocity of the engine crank shaft and which currents are employed to actuate an electrical indicator unit to remotely indicate the engine's speed, such as the indicator unit 40 of Fig. 1. The carrier 28 is adapted to be shifted in a plane parallel to the plane of the disc 25 and the longitudinal axis of the roller 30, by means of a link 42 pivotally connected at its lower end to the carrier and pivotally connected at its upper end to a bell-crank arm 43, the bell crank being pivotally supported as at 44 and having its other arm 45 connected by means of a flexible link 46 to the end of a Bourdon tube 47, the relation of the parts as illustrated in Figure 3 being in the position corresponding to the condition of maximum torque. The inner end of the Bourdon tube 47 is secured in a rigid support 48, the latter serving to place the tube 47 into communication with the fluid pressure conduit 50.

*Operation*

The operation of the device illustrated in Figs. 1-3, inclusive is as follows:

As previously described the torque indicator illustrated in Fig. 1, of well-known construction, will develop a fluid pressure in the conduit 50 which is a measure of the output torque of the engine 1a. The fluid pressure developed in the conduit 50 will be transmitted to the Bourdon tube 47 in the speed control device illustrated in Fig. 3 and cause the tube to expand and rotate the bell crank arms 43 and 45 in a counterclockwise direction about their pivot point 44 causing the link 42 to be depressed and moving the carrier 28 radially outward from the center of the friction disc 25. At any instant the position of the carrier 28 and the idler rollers 27 with respect to the axis of rotation of the friction disc 25 will be determined by the pressure existing within the conduit 50 and hence will depend upon the existing value of the engine torque, and by suitable design of the Bourdon tube 47 and link 46 and arms 43 and 45, this position can be so determined that it will be equal to, or directly in proportion to, the existing value of the engine torque expressed in foot-pounds. It is thus possible by means of the shiftable carrier 28 to change the driving speed of the shaft 32 and hence the speed of the tachometer generator from a value equal to, or directly proportional to the speed of the engine 1a, to a value equal to the instant engine speed multiplied by the factors K and $P_q$, as previously discussed above, so that the final speed of the tachometer generator will be numerically equal to, or directly proportional to the actual value of the horsepower output of the engine. The speed indication in terms R. P. M. of the tachometer generator given by the pointers 42 and 43 of the indicator unit 40 may then be directly numerically interpreted in terms of the engine horsepower delivered at any instant. The indicator unit 40 as illustrated in Fig. 1 is of the two-pointer type in which the pointer 42 indicates revolutions in thousands and the pointer 43 indicates revolutions in hundreds of revolutions per minute and makes one complete revolution of the dial while pointer 42 advances one division on the dial. The positions of the pointers are interpreted in the same manner as reading a clock to determine the total number of revolutions per minute and, of course, the reading of the tachometer indicator unit 40 is interpreted in terms of horsepower in exactly the same manner.

While the invention has been illustrated as employing a tachometer of the electric type, it is, of course, to be understood that tachometers of a different type such as a centrifugal tachometer may be employed for the same purpose, and in such a case would be directly driven from the shaft 32 by means of a flexible cable drive, and further it is to be understood that the invention is not limited in its application to the particular type of torque measuring means illustrated in the drawing since it is obvious that any torque measuring device which is capable of positioning an element in accordance with the existing value of engine torque may be employed to position the control rod 42 of the change speed transmission 20, and further other variable speed transmissions than the friction-driving type may be employed to serve in a similar capacity, it only being necessary that the transmission be provided with a control element shiftable or rotatable to vary the driving ratio of the transmission.

While a single form of the invention has been illustrated and described it will be apparent to those skilled in the art that many variations and changes may be made therein falling within the scope of the invention as defined by the appended claims.

I claim:

1. A device for indicating the horsepower output of an internal combustion engine, comprising dynamometer means operatively associated with the engine and responsive to the reaction torque exerted by the engine power transmission gearing for generating a fluid pressure proportional to the instant value of engine torque; a variable speed change mechanism mounted near the engine and consisting of a power-receiving member driven from the engine, a power take-off member, and a ratio-controlling device which takes the power from the power-receiving member and transmits it to the power take-off member, said device being operable to vary the speed ratio between the power-receiving member and the power take-off member; speed measuring means including a transmitter unit connected to and operated by the power take-off member, and an indicator unit mounted remotely from the transmitter unit and operatively connected to the latter to be actuated proportionally to the output of the transmitter unit, said indicator unit being calibrated to indicate horsepower; and pressure-responsive means operatively connecting the ratio-controlling device with the dynamometer means and actuated by and proportionally to the increase and decrease in the said fluid pressure to move the ratio-controlling device to a ratio-controlling position increasing or decreasing the speed of the transmitter unit in accordance with corresponding changes in engine torque whereby the output of the transmitter unit is a product of the instant values of engine torque and speed.

2. A device for indicating the horsepower output of an internal combustion engine, comprising speed measuring means including an electrical indicator unit calibrated to indicate horsepower and a generator unit electrically connected with the indicator unit to actuate the same in accordance with the output of the generator, a variable speed transmission driven by the engine and operatively connected with the rotor of the generator to drive the same and including a movable control element positionable to vary the speed ratio between the engine and the generator rotor, torque-responsive means operatively associated with the engine to be actuated in response to torque exerted by the engine, and a connection between said torque-responsive means and said control element operated by the action of the torque-responsive means to move the control element to a ratio-controlling position increasing or decreasing the speed of the generator rotor in accordance with corresponding changes in engine torque whereby the output of the generator is a product of the instant values of engine torque and speed.

RAYMOND W. JONES.